E. M. THOMPSON.
MEANS FOR COMPENSATING TACHOMETERS FOR TEMPERATURE VARIATIONS.
APPLICATION FILED MAY 22, 1911.

1,088,943.

Patented Mar. 3, 1914.

Witnesses:

Inventor
Edward M. Thompson
By his Attorney
Samuel E. Darby

UNITED STATES PATENT OFFICE.

EDWARD M. THOMPSON, OF BELOIT, WISCONSIN, ASSIGNOR, BY MESNE ASSIGNMENTS, TO STEWART-WARNER SPEEDOMETER CORPORATION, A CORPORATION OF VIRGINIA.

MEANS FOR COMPENSATING TACHOMETERS FOR TEMPERATURE VARIATIONS.

1,088,943.     Specification of Letters Patent.     Patented Mar. 3, 1914.

Application filed May 22, 1911. Serial No. 628,652.

*To all whom it may concern:*

Be it known that I, EDWARD M. THOMPSON, a citizen of the United States, residing at Beloit, county of Rock, State of Wisconsin, have made a certain new and useful Invention in Means for Compensating Tachometers for Temperature Variations, of which the following is a specification.

The invention relates generally to devices of the class known as tachometers, and particularly, to speed indicating devices, such, for instance, as are emloyed in connection with automobiles, to indicate their speed of travel.

The object of the invention is to provide means which are simple and efficient for automatically compensating instruments of the class referred to for temperature variations, whereby to secure accuracy of speed indications at different atmospheric temperatures, and more specifically stated the object is to provide simple and efficient means for automatically varying the strength of a magnetic field the influence or effect of which field is utilized to impart movements to the movable member of a scale and pointer mechanism or other indicating means.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Figure 2:
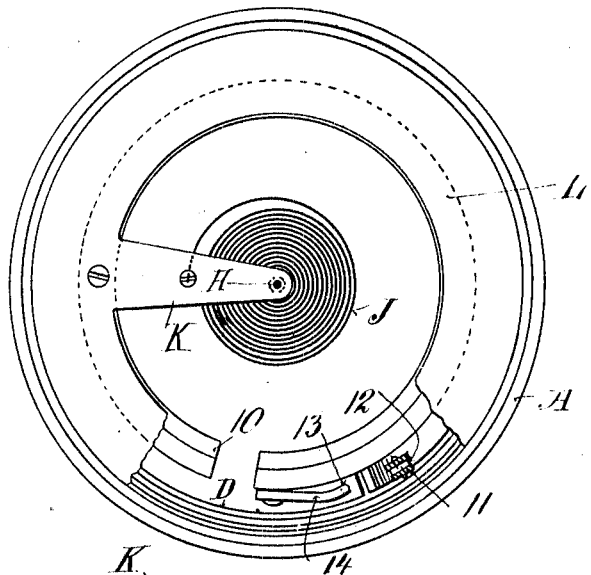
Figure 1:
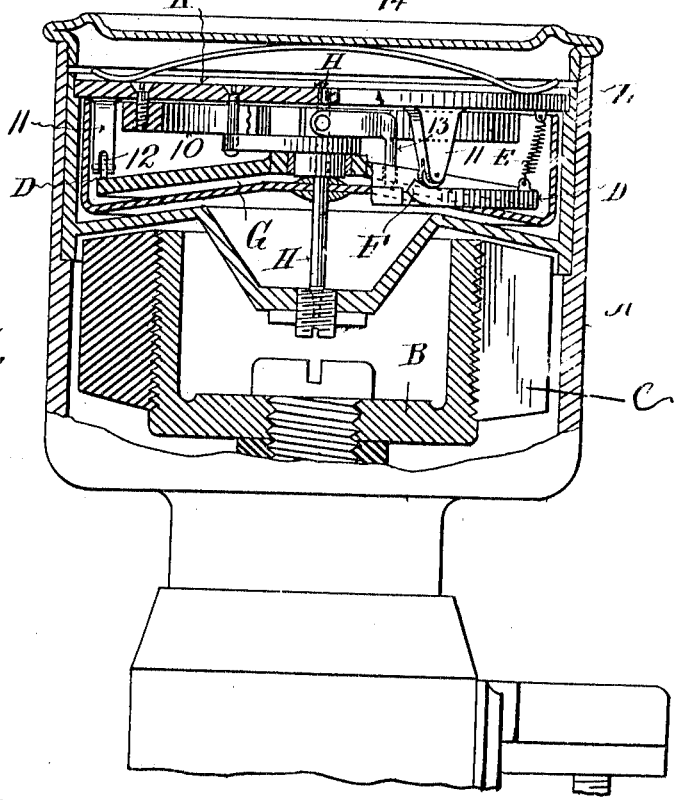

Referring to the accompanying drawing, and to the various views and reference signs appearing thereon:—Figure 1 is a view showing a form of speed indicating device and a construction of atmospheric temperature variation compensating mechanism embodying my invention applied thereto, parts in central longitudinal section, parts broken out and parts in elevation. Fig. 2 is a top plan view of the same, parts broken out and parts removed to more clearly disclose the construction and relation of parts.

In the manufacture of speed indicators it has been the custom to adjust the parts to give accurate readings at a normal mean temperature. For ordinary purposes of use of instruments so adjusted this is usually sufficient since variations in indications due to changes in atmospheric temperature from a mean temperature, under the conditions of practical use of the instrument, particularly when used as an automobile speed indicator, are ordinarily quite small. It may sometimes however be desirable, particularly where greater accuracy is desired, and where the instruments are, or may be, used for other purposes in addition to their use as automobile speed indicators, to make compensating adjustment for even the small variations of the indication of instruments of the class referred to due to varying atmospheric temperature conditions under which the instrument is used, whereby an absolutely accurate and correct indication is given at all temperatures.

The automatic accomplishment of this result is among the special objects and purposes of my present invention.

In instruments of this class the desired speed indications are made by means of an associated scale and pointer or hand, one of these parts usually being fixed and the other arranged to be displaced relatively thereto and proportionally to the speed to be indicated, that is, said parts are usually arranged to be relatively shifted proportionally to the speed to be indicated. The displaceable or relatively displaceable member is ordinarily held yieldingly in an initial or "zero" position and is relatively displaced or moved from such initial position against the action of a hair or other spring. The means for effecting the rotative or relative displacement of the movable member of the scale and pointer mechanism may be varied throughout a wide range, and various constructions, mechanical, centrifugal as well as magnetic, are at present on the market for accomplishing this result.

I have shown and will now describe my invention as applied to speed indicator of the magnetic type, that is of the type in which the movable element of the scale and pointer device is rotatively displaced by means of a rotating magnetic field. In the magnetic type of instrument the movable member of the scale and pointer device is ordinarily associated with a disk, cup, or other convenient form of device or member arranged within the influence of the rotating magnetic field and is of such material as to be influenced and rotatively displaced, against the action of a hair spring, by the magnetic drag exerted thereon of the rotating field. Various arrangements or means for producing the rotating magnetic field are embodied in instruments now on the market. While, therefore, I have shown and will now describe one form of means for accomplishing the desired results, my invention, as defined in the claims, is not to be limited or restricted to this particular arrangement.

In carrying out my invention I propose to employ a thermostatic or other device capable of being influenced by variations in atmospheric temperature, and to employ movements of the thermostatic device due to variations in atmospheric temperature to effect corresponding variations in the strength of the rotating magnetic field, in, proper proportional relation to the variations in atmospheric temperature.

In the drawings A, designates a casing in which is mounted to rotate a carrier B, carrying a magnet C, rotation being imparted to the magnet carrier by suitable connections, and in the ordinary manner, with the shaft or other part the speed of which is to be indicated. Coöperating with the magnet is a member D, which is of magnetic material and which constitutes a magnetic mass and which I will designate the field ring or disk, the function of which is to concentrate the lines of force in the magnetic field or air gap space between the same and the magnet. In the form shown the member D is supported for movement toward and from the rotating magnet C, so as to vary the effective strength of the magnetic field in the space between these members. The member D, is also arranged to be shifted rotarily about its geometric axis within the casing A, being suspended therein from a stationary ring L by means of springs E, or other yielding supports, and is provided with a series of inclined surfaces, guides or cams F, as shown. Interposed between the magnet C and the mass D or in such relation thereto as to be influenced by the lines of force of the magnetic field maintained between said magnet and mass is a member G, carried by a spindle H, journaled in suitable bearings, and which member G in the present instance, constitutes the rotative or movable part of the scale and pointer mechanism of the instrument. This movable scale member G, is normally held in an initial or "zero" position by means of a hair spring J, which is connected at one end to the spindle H, and at the other end to a fixed arm K, forming part of the ring L, which is stationarily mounted within the casing. The spring is so arranged with reference to the spindle H, as to yieldingly resist the rotative movements in one direction of said spindle.

Arranged within the casing is a thermostatic device, indicated at 10, that is, a device which is sensitive to temperature variations, and which, in the particular construction shown, comprises a thermopile consisting of associated split rings of metals having different heat coefficients, or different expansive characteristics. This thermostatic device is arranged within the casing A in such relation that the ends thereof approach or recede from each other under the action of variations in atmospheric temperatures. Connected to move with the thermostatic device when moved under variations of atmospheric temperature is an arm 14, arranged tangential to the circle of the thermostatic device, and carrying a pin 13, in its free end which is connected to the field ring or mass D, whereby as the thermostatic device acts under variations in atmospheric temperature, the field ring or mass D is rotatively shifted or moved about its geometric axis. The ring L, is provided with arms 11, which extend toward and bear upon the inclined or cam surfaces F, of the members D. If desired, and in order to reduce friction, rollers 12, may be mounted in the ends of the arms 11, which take bearing upon the inclined cam surfaces F. The inclined surfaces of member D, are yieldingly held against the ends of arms 11, with the inclined or cam surfaces F, bearing against the rollers 12, by means of the springs E.

From this description it will be readily seen that any shifting of the thermostatic member 10, due to variations in atmospheric temperature will cause the ring or mass D to be shifted or moved axially, thereby causing the inclined or cam surfaces F, to move past the rollers 12 whereby the member D, is automatically shifted relatively to the magnet to automatically vary the effective action of the rotating magnetic field, thereby varying the influence exerted by the field upon the displaceable member G, and automatically compensating for the temperature variation in readings of the instrument.

A convenient method of forming the inclined or cam surfaces F, in the member D, is to stamp or press the same out of the material of said member, though my invention, as defined in the claims, is not to be limited or confined in this respect.

While I have shown and described my invention as applied to an automobile speed indicating device I do not desire to be limited or restricted in respect to this particular use thereof as it is obvious that my invention may be equally well adapted for use in connection with instruments used for other purposes.

Having now set forth the object and nature of my invention, and a construction embodying the principles thereof, what I claim as new and useful, and of my own invention, and desire to secure by Letters Patent is:

1. In a magnetic speed indicating device, a magnet and a magnetic device, means for rotating one of these parts to create a rotating magnetic field, and a scale and pointer mechanism arranged to be displaced by said field in combination with a thermostatic device, an arm carried thereby, and connected to the magnetic mass to move the same rotatively, relatively to the magnet, and means for engaging the mass when rotatively moved relatively to the magnet to shift said mass toward and from the magnet.

2. In a tachometer, means for creating a field including a magnet and a magnetic mass, a thermostatic device carrying an arm arranged to engage one of the members of the field creating means, whereby variations in atmospheric temperature cause said member to be shifted, and means operating when said member is thermostatically shifted to move said member relatively to the other member of the field creating means, to automatically vary the strength of the magnetic field, and means arranged within the influence of said field to be acted on thereby.

3. In a tachometer the combination of means for creating a concentrated rotating magnetic field including a magnet and a magnetic mass, a member arranged within the influence of said field to be rotated thereby, a thermostatic device, a connection between said device and said mass to shift the latter rotatively about its geometric axis in accordance with temperature variations, a fixed arm, said magnetic mass having an inclined surface arranged in the path of the end of said arm, whereby when said mass is rotatively moved it is shifted toward and from the magnet, to vary the strength of the magnetic field.

4. In a tachometer the combination of means for creating a concentrated rotating magnetic field, including a magnet and a magnetic mass, a member arranged within the influence of said field to be rotated thereby, said magnetic mass having inclined surfaces, a thermostatic device, means for connecting said device with the mass to shift or move the same rotatively, fixed arms, means attached thereto and arranged to engage said inclined surfaces, and means for yieldingly holding said inclined surfaces in bearing contact against said arms.

5. In a tachometer, means for producing a concentrated rotating magnetic field including a magnet, and a magnetic mass, a member arranged within the influence of the rotating magnetic field to be displaced thereby, the said magnetic mass having inclined surfaces, a thermostatic device having means connecting it to the magnetic mass to rotatively shift the same, fixed arms having rollers to engage said inclined surfaces, and means for yieldingly maintaining said surfaces pressed against said rollers.

6. In a tachometer, the combination with a casing, a magnet rotatably mounted therein, a magnetic mass arranged adjacent the pole faces of said magnet, an oscillatory member interposed between the magnet and magnetic mass to be influenced by the magnetic field therebetween, a thermostat arranged within the casing and means for connecting said thermostat to the magnetic mass to rotatively displace the same, fixed arms extended toward the magnetic mass, said magnetic mass having inclined surfaces, and springs connected to the magnetic mass and operating to yieldingly press the inclined surfaces of said mass toward said arms.

7. In a tachometer, the combination with means for creating a concentrated rotating magnetic field, including a magnet and a magnetic mass, means for rotating one of said parts, a member arranged within the influence of said field to be displaced thereby, a thermostatic device, means for connecting said device to said magnetic mass to shift or move the same rotatively according to variations in temperature, and means operative by the rotative movements of said mass to vary the strength of the field.

8. In a tachometer, the combination with means for creating a concentrated rotating magnetic field, a member arranged within the influence of said field to be displaced thereby, a thermostatic device, means for connecting said device to one of the members of the rotating field creating means to shift the same rotatively according to variations in temperature, and means arranged in the path of said member when shifted rotatively to move the same in a direction to vary the strength of the magnetic field.

In testimony whereof I have hereunto set my hand in the presence of the subscribing witnesses, on this 25th day of April A. D., 1911.

EDWARD M. THOMPSON.

Witnesses:
H. W. ADAMS,
CHARLES H. WARNER.